(12) United States Patent
Slater et al.

(10) Patent No.: US 10,776,210 B2
(45) Date of Patent: Sep. 15, 2020

(54) RESTORATION OF CONTENT OF A VOLUME

(71) Applicant: Hewlett Packard Enterprise Development LP, Houston, TX (US)

(72) Inventors: Alastair Slater, Chepstow (GB); Peter Thomas Camble, Bristol (GB); Andrew Todd, Bristol (GB); Simon Pelly, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 828 days.

(21) Appl. No.: 15/281,910

(22) Filed: Sep. 30, 2016

(65) Prior Publication Data

US 2018/0095833 A1 Apr. 5, 2018

(51) Int. Cl.
G06F 11/14 (2006.01)
G06F 16/174 (2019.01)
(Continued)

(52) U.S. Cl.
CPC ...... G06F 11/1451 (2013.01); G06F 11/1453 (2013.01); G06F 16/128 (2019.01);
(Continued)

(58) Field of Classification Search
None
See application file for complete search history.

(56) References Cited

U.S. PATENT DOCUMENTS

| 7,165,156 B1 | 1/2007 | Cameron et al. |
| 7,191,304 B1 | 3/2007 | Cameron et al. |

(Continued)

FOREIGN PATENT DOCUMENTS

| WO | 2016/064387 A1 | 4/2016 |
| WO | 2016/069030 A1 | 5/2016 |
| WO | WO-2016080949 | 5/2016 |

OTHER PUBLICATIONS

Uknown, "Disaster Recovery", Rackware, retrieved Dec. 17, 2015, 5 pages.

*Primary Examiner* — Usmaan Saeed
*Assistant Examiner* — Yu Zhao
(74) *Attorney, Agent, or Firm* — Hewlett Packard Enterprise Patent Department

(57) ABSTRACT

Example embodiments relates to method and systems to restore content of a volume at a given point in time. A computing device to restore content of a volume at a given point in time comprises a physical processor and a machine-readable storage medium comprising machine readable instructions executable by the processor that cause the computing device to command a storage array to select a surviving snapshot that was created at a nearest point in time to the given point in time among a set of surviving read-only snapshots of content of the volume stored in the storage array, command the storage array to create an editable surviving snapshot of the selected surviving snapshot, perform a delta function associated with a deduplication system, the deduplication system comprising a set of backup objects for the set of surviving read-only snapshots and a set of backup objects for a set of non-surviving read-only snapshots of content of the volume and restore content of the volume at the given point in time by commanding the storage array to modify the editable surviving snapshot based on an output of the delta function. Each of the backup objects within the deduplication system comprises a manifest, the manifest comprising a list of chunk signatures that represents chunks of data. The delta function is performed between a manifest of a backup object of the selected surviving snapshot and a manifest of a backup object of a snapshot created at the given point in time.

20 Claims, 5 Drawing Sheets

(51) Int. Cl.
*G06F 16/11* (2019.01)
*G06F 16/215* (2019.01)

(52) U.S. Cl.
CPC ........ *G06F 16/1752* (2019.01); *G06F 16/215*
(2019.01); *G06F 11/1466* (2013.01); *G06F*
*2201/84* (2013.01)

(56) References Cited

U.S. PATENT DOCUMENTS

| | | | |
|---|---|---|---|
| 7,743,031 | B1 | 6/2010 | Cameron et al. |
| 7,774,315 | B1 | 8/2010 | Galker |
| 8,082,407 | B1 * | 12/2011 | Chatterjee ............. G06F 9/4416 |
| | | | 707/639 |
| 8,176,272 | B2 | 5/2012 | Augenstein et al. |
| 8,250,031 | B2 | 8/2012 | Kawaguchi |
| 8,335,770 | B2 | 12/2012 | Merchant et al. |
| 8,539,179 | B1 | 9/2013 | Stringham |
| 8,650,162 | B1 | 2/2014 | Vaikar et al. |
| 8,732,417 | B1 | 5/2014 | Stringham |
| 8,738,870 | B1 | 5/2014 | Balasubramanian et al. |
| 8,788,769 | B2 | 7/2014 | Abercrombie et al. |
| 8,789,208 | B1 * | 7/2014 | Sundaram ............... H04L 29/06 |
| | | | 726/29 |
| 8,805,786 | B1 | 8/2014 | Natanzon |
| 8,874,841 | B2 | 10/2014 | Patterson et al. |
| 2010/0162039 | A1 * | 6/2010 | Goroff ................. G06F 11/1451 |
| | | | 714/6.12 |
| 2010/0179941 | A1 | 7/2010 | Agrawal et al. |
| 2012/0317359 | A1 | 12/2012 | Lillibridge |
| 2012/0330903 | A1 * | 12/2012 | Periyagaram ......... G06F 3/0608 |
| | | | 707/692 |
| 2013/0007183 | A1 * | 1/2013 | Sorenson, III ........ G06F 3/0607 |
| | | | 709/213 |
| 2014/0095816 | A1 * | 4/2014 | Hsu ...................... G06F 3/0655 |
| | | | 711/162 |
| 2014/0317369 | A1 | 10/2014 | Wade et al. |
| 2016/0320978 | A1 * | 11/2016 | Barve ..................... G06F 3/065 |
| 2017/0060473 | A1 * | 3/2017 | Fitzhardinge ....... G06F 12/0269 |
| 2017/0293531 | A1 | 10/2017 | Watkins et al. |

* cited by examiner

515 PROCESSING RESOURCE

505 MACHINE-READABLE STORAGE MEDIUM ASSOCIATED WITH A COMPUTING DEVICE

501 INSTRUCTIONS TO RESTORE CONTENT OF A VOLUME AT A GIVEN POINT IN TIME

510 INSTRUCTIONS TO SELECT A SURVIVING SNAPSHOT FROM A SET OF SURVIVING READ-ONLY SNAPSHOTS OF CONTENT OF THE VOLUME STORED IN A STORAGE ARRAY WITHIN THE COMPUTING DEVICE, THE SELECTED SNAPSHOT BEING CREATED AT A NEAREST POINT IN TIME TO THE GIVEN POINT IN TIME

520 INSTRUCTIONS TO CREATE AN EDITABLE SURVIVING SNAPSHOT OF THE SURVIVING SNAPSHOT

530 INSTRUCTIONS TO PERFORM A DELTA FUNCTION ASSOCIATED WITH A REMOTE DEDUPLICATION SYSTEM

540 INSTRUCTIONS TO RESTORE CONTENT OF THE VOLUME AT THE GIVEN POINT IN TIME BY MODIFYING THE EDITABLE SURVIVING SNAPSHOT BASED ON AN OUTPUT OF THE DELTA FUNCTION

RESTORATION OF CONTENT OF A VOLUME

BACKGROUND

Computer systems comprise host computing devices that communicate with storage devices to store data. The right backup and recovery services strategy may be a critical component in every company's IT infrastructure. Deduplication is a data compression technique that can be used to eliminate duplicate copies of repeated data. A snapshot can be a type of backup copy that can be used to create a copy of an application, disk or system.

BRIEF DESCRIPTION OF THE DRAWINGS

The following detailed description references the drawings, wherein:

FIG. 5 is a block diagram depicting an example machine-readable storage medium comprising instructions executable by a processor to restore content of a volume at a given point in time.

DETAILED DESCRIPTION

Protecting applications without impacting performance can be challenging. It can get even more challenging when facing unrelenting data growth, stringent recovery service level agreements (SLAs), and increasingly virtualized environments. Traditional backup approaches as a full restore (recovering "most bytes" present from a backup copy) or, or direct mount of a disk presentation from a backup copy may suggest the need of an improvement in system's efficiency, space affordability and data protection.

Examples described herein relate to systems and methods that can use backup copies of snapshots stored in a deduplication system to restore a volume on a data storage array at a particular point in time. A delta function corresponding to the difference between the current content within the storage array and the backed up data stored in the deduplication system can be used to achieve volume restoration and minimize network bandwidth to effect a full restore. Examples described herein can increase efficiency of the recovery system by selecting the nearest snapshot to the recovery point objective (e.g. desired restoration point of content of the volume) or by volumetric comparison of restore data between snapshots. Furthermore, metadata, instead of full backup copies, can be used by examples described herein in performing a delta function and thereby reduce network bandwidth to effect a full restoration of a volume.

Figure 1:
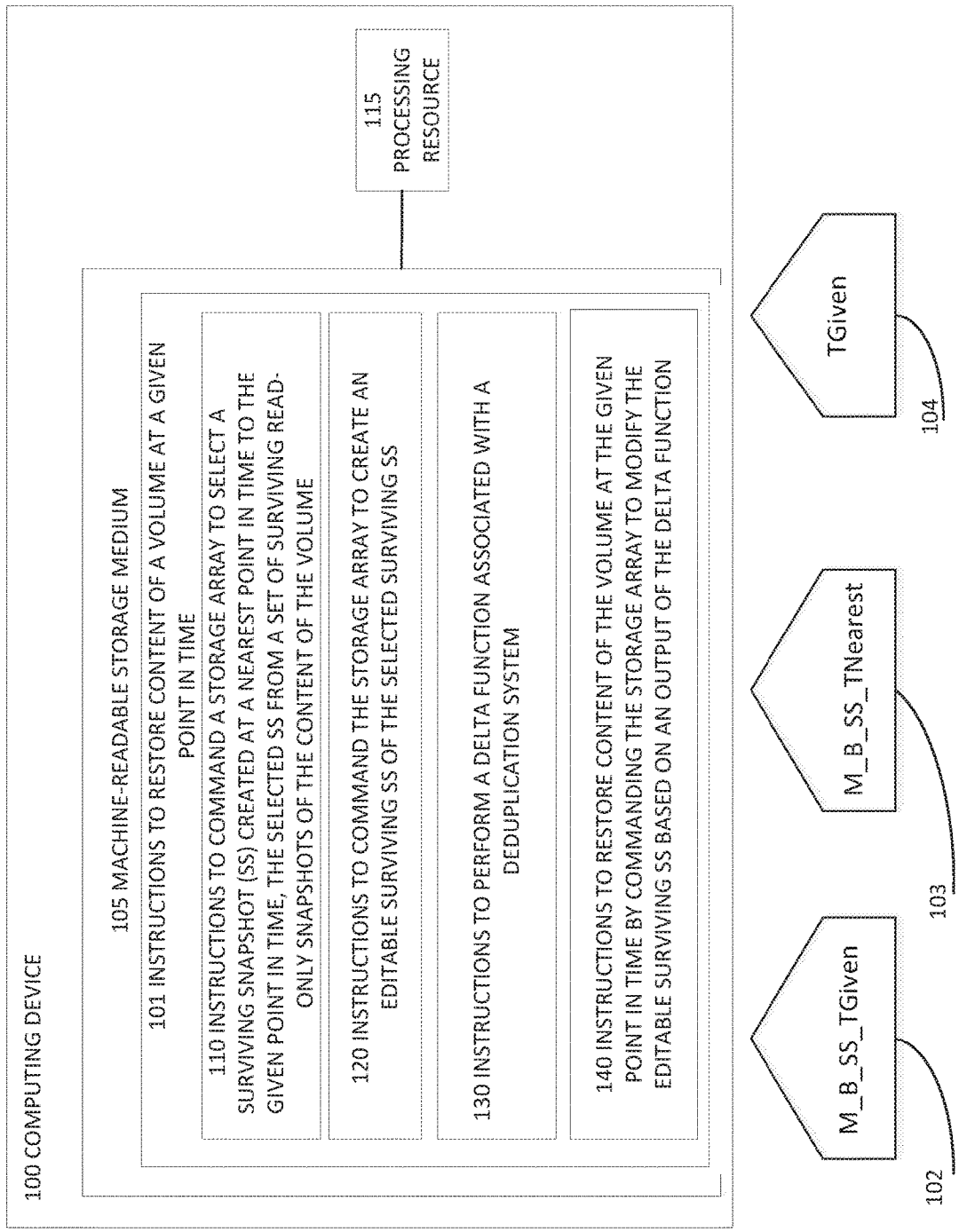
FIG. 1 is a block diagram of an example computing device to restore content of a volume at a given point in time.

Referring now to the drawings, FIG. 1 shows an example of a computing device 100 to restore content of a volume at a given point in time. The computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or Internet network that perform the functions described herein. In the example shown in FIG. 1, computing device 100 includes a processing resource 115 and a non-transitory machine-readable storage medium 105 encoded with instructions 101 to restore content of a volume at a given point in time. The instructions 101 may include at least instructions 110, 120, 130 and 140, as described below.

The processing resource 115 may be one or more central processing units (CPUs), semiconductor-based microprocessors, and/or other hardware devices suitable for retrieval and execution of instructions stored in a machine-readable storage medium 105. The processing resource 115 may fetch, decode, and execute instructions 110, 120, 130 and 140 and/or other instructions to implement the procedures described herein. As an alternative or in addition to retrieving and executing instructions, the processing resource 115 may include one or more electronic circuits that include electronic components for performing the functionality of one or more of instructions 110, 120, 130 and 140.

In an example, the program instructions 110, 120, 130 and 140 and/or other instructions can be part of an installation package that can be executed by the processing resource 115 to implement any of the functionality described herein. In such a case, the machine-readable storage medium 105 may be a portable medium such as a CD, DVD, or flash drive or a memory maintained by a computing device from which the installation package can be downloaded and installed. In another example, the program instructions may be part of an application or applications already installed on the computing device 100.

The machine-readable storage medium 105 may be any electronic, magnetic, optical, or other physical storage device that contains or stores executable data accessible to the computing device 100. Thus, the machine-readable storage medium 105 may be, for example, a Random Access Memory (RAM), an Electrically Erasable Programmable Read-Only Memory (EEPROM), a storage device, an optical disc, and the like. The machine-readable storage medium 105 may be a non-transitory storage medium, where the term "non-transitory" does not encompass transitory propagating signals. The machine-readable storage medium 105 may be located in the computing device 100 and/or in another device in communication with the computing device 100.

As described in detail below, the machine-readable storage medium 105 may be encoded with instructions 101 to restore content of a volume at a given point in time. Reference 104 represents an indication of a given point in time that may be provided as input to the computing device 100. The given point in time 104 can be selected by, for example, an administrator or a user of the computing device 100 or by a computer program executed in a computing system remote from computing device 100. The given point in time can be selected from a set of discrete timestamps associated with a set of available backup objects stored in a deduplication system. The machine-readable storage medium 105 can comprise instructions 110 to command a storage array to select a surviving snapshot that was created at a nearest point in time to the given point in time among a set of surviving read-only snapshots of content of a volume stored in the storage array.

In examples described herein, the computing device 100 may further receive as an input descriptive information of a snapshot associated with a recovery point objective created by the storage array. Hence, the machine-readable storage medium 105 can comprise instructions 110 to command the storage array to select a surviving snapshot based on a volumetric comparison among the recovery point objective snapshot and the set of surviving read-only snapshot of content of the volume stored in the storage array. In such examples, instructions 110 may select the surviving snapshot having the least volume of restore data relative to the objective snapshot.

The read-only snapshots that are part of the set of surviving read-only snapshots may be determined based on retention/expiry settings defined by a user or system administrator. In examples described herein, a snapshot ("SS") may be a fully independent copy of content of a volume at a particular point in time. The snapshots may be read-only entities for consistency purposes. The snapshots can be automatically created in the storage array. Each snapshot created in the storage array can have an associated timestamp that can specify the date of creation of a corresponding snapshot. A storage array can be defined as a storage hardware that can contain hard disk drives (HDDs) or flash drives for capacity. In examples described herein, a volume may be a unit of data storage in a storage array. The volume can be associated with a storage array that can receive commands from the computing device 100 via a computing network (e.g., a local area network (LAN), a virtual LAN (ULAN), a wireless local area network (WLAN), a virtual private network (VPN), the Internet, or the like, or a combination thereof). A surviving snapshot (SS_Tnearest) that was created at a nearest point in time to the given point in time provided as input to computing device 100 can be comprised within a set of surviving read-only snapshots within the storage array. The set of surviving read-only snapshots can be defined as the snapshots stored in the storage array. Instructions 110 can permit the computing device 100 to determine the SS_Tnearest from the set of surviving read-only snapshots stored in the storage array upon reception of a given point in time. Furthermore, instructions 100 may command the storage array to select the determined read-only snapshot SS_Tnearest from among the set of surviving read-only snapshots stored in the storage array. Hence, the computing device 100 upon execution of instructions 110 may determine the SS_Tnearest by comparing the date of creation of each read-only snapshot from the set of surviving snapshots previously stored in the storage array with the given point in time 104 provided to the computing device 100 as input. Hence, once the computing device determines the surviving snapshot having been identified the SS_Tnearest, the computing device commands the storage array to select the SS_Tnearest from the set of surviving read-only snapshots.

In other examples described herein, upon reception of information associated with a recovery point objective snapshot, the computing device 100 by executing instructions 110 may determine the snapshot SS_Tnearest by volumetric comparison of restore data among the set of surviving read-only snapshots and the recovery point objective snapshot SS_Tgiven, where the volume of restore data responsive to selecting the surviving snapshot is minimum.

Instructions 120 can command the storage array to create and editable surviving snapshot (E_SS_Tnearest) of the selected snapshot SS_Tnearest. The editable surviving snapshot E_SS_Tnearest may be editable (rather than read-only), and may permit the computing device 100 to modify chunks of data in order to restore content of the volume at the given point in time.

The machine-readable storage medium 105 can comprise instructions 130 to perform a delta function associated with a deduplication system. In examples described herein, a deduplication system may be a system with deduplication processing capabilities comprising a set of snapshot backup objects B_SS's associated with the set of timestamps specifying the date of creation of each snapshot. All the backups objects can be deduplicated to reduce backup storage requirements. In the deduplication process, chunks of data within a read-only snapshot can be identified and represented by a list of chunk signatures referred to herein as a "manifest". Hence, each backup object from the set can be associated with a read-only snapshot from the storage array and a manifest that represents the read-only snapshot. During the deduplication process, unique chunks of data of the snapshots can be stored by the deduplication system. Other chunks of data can be compared to the stored chunks and whenever a match is found, the redundant chunk can be associated with a chunk signature, from a list of chunks signatures that may point to a stored copy of the chunk. In some examples, the deduplication system can comprise a set of backup objects for the set of surviving read-only snapshots created in the storage array and a set of backup objects for a set of non-surviving read-only snapshots of content of the volume. The backup objects for the set of non-surviving read-only snapshots of content of the volume may represent snapshots that are not (or are no longer) stored in the storage array.

A delta function associated with the deduplication system can be performed by the computing device 100 by executing instructions 130. The computing device 100 may retrieve a manifest 102 of a backup object of a read-only snapshot created at the given time, where the given point in time can be selected from the set of timestamps associated with the set of backup objects available in the deduplication store 270 (e.g., manifest M_B_SS_Tgiven) and a manifest 103 of a backup object of the selected surviving snapshot at the nearest point in time to the given point in time (e.g., manifest M_B_SS_Tnearest) upon discrete request to the deduplication system 270. Hence, the manifests 102 and 103 may be retrieved by the computing device 100 upon discrete request to the deduplication system.

In such examples, the delta function between the manifests that can be performed by the computing device 100 by executing instructions 130 can be represented as follows:

$$\mathrm{delta}(M\_B\_SS\_Tnearest, M\_B\_SS\_Tgiven)$$

The manifest 103 (M_B_SS_Tnearest) and the manifest 102 (M_B_SS_Tgiven) can be received at the computing device 100 upon request in order to perform the delta function that can analyze the list of chunk signatures within the manifest 102 representing a backup of snapshot SS_Tgiven and the list of chunk signatures within the manifest 103 representing a backup of snapshot SS_Tnearest. The delta function (or delta operation), when performed on different manifests, may identify the differences between the lists of chunk signatures (e.g. the variation of the chunk signatures linked to the data chunks of the SS_Tnearest with respect to the chunk signatures linked to the data chunks of the SS_Tgiven). In such examples, the delta function performed by instructions 130 may identify the differences in chunk signatures between two manifests.

The machine-readable storage medium 105 can comprise instructions 140 to restore content of the volume at the given time by commanding the storage array to modify the editable surviving snapshot (E_SS_Tgiven) based on results (or output) of the delta function performed by instructions 130. Hence, the content of the volume at Tgiven can be based on modifying the editable snapshot E_SS_Tnearest based on the output of the delta function (e.g, delta(M_B_SS_Tnearest, M_B_SS_Tgiven)). Modifying the E_SS_Tnearest can comprise adding, removing, replacing, etc. specific chunks of data of the E_SS_Tnerest specified by the output of the delta function (i.e. a differing manifest indicating the variation of the chunk signatures linked to the data chunks of the SS_Tnearest with respect to the chunk signatures linked to the data chunks of the SS_Tgiven). In this respect, the output of the delta function can comprise a differing manifest indicating the chunks of data of the E_SS_Tnearest that may be modified to restore content of the volume at Tgiven.

In such examples, content of the volume at a given point in time can be restored to recreate the volume by applying the output of a delta function between two manifests to the editable surviving snapshot (E_SS_Tnearest).

Figure 2:
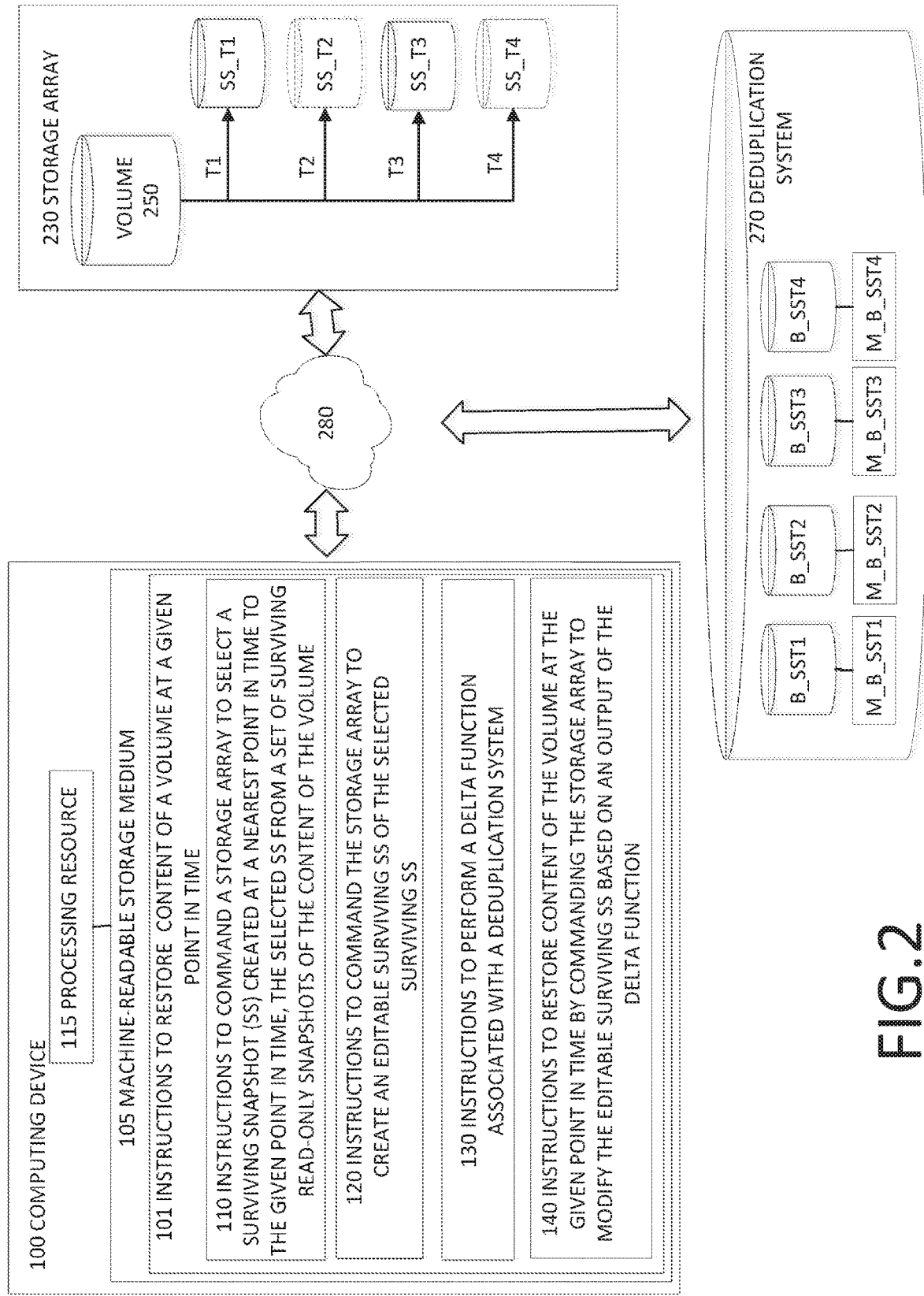
FIG. 2 is a block diagram of an example computing device to restore content of a volume at a given point in time.

Turning now to FIG. 2, FIG. 2 shows the previously shown computing device 100 in communication with a storage array 230 and a deduplication system 270. The computing device 100, the storage array 230 and the deduplication system 270 can be in communication via a computer network as described above (e.g., a computer network 280).

In this particular example, the storage array 230 can comprise a volume 250. In some examples, the storage array can be a disc storage array such as an array of multiple storage devices (e.g., solid-state drives (SSDs), hard disk drives (HDDs), etc.). The volume 250 may be implemented by a storage device, or a parent volume implemented by multiple storage devices. The machine-readable storage medium 105 can comprise instructions to command the storage array to create a plurality of read-only snapshots of content of the volume. A greater number of created snapshots may enable a greater number of recovery points. The plurality of read-only snapshots of content of the volume 250 may make up the set of surviving read-only snapshots and the set of non-surviving read-only snapshots for storage array 230. In particular for the present example of FIG. 2, the storage array 230 can create read-only snapshots SS_T1, SS_T2, SS_T3 and SS_T4. Each snapshot created by the storage array 230 can comprise an associated timestamp Ti embedded as metadata in the snapshot. In FIG. 2, the timestamps T1, T2, T3 and T4 are shown. An example of timestamp can be Mar. 15, 2015 or Monday 15:40 GMT. Hence, FIG. 2 shows snapshots created at timestamps T1, T2, T3 and T4. In this example, with regard to the set of timestamps, the timestamp T1 is considered the earliest time and timestamp T4 is the latest time, with time T2 after T1 and prior to T3, as shown.

The machine-readable storage medium 105 can comprise instructions to command the storage array 230 to transmit to the deduplication system the plurality of read-only snapshots of content of the volume. The deduplication system may then create a set of backup objects associated based on the transmitted read-only snapshots associated with the aforementioned timestamps. Hence, responsive to the creation of a new read-only snapshot within the storage array 230 at a particular timestamp, the computing device 100 may command the storage array to transmit the newly created read-only snapshot to the deduplication system 270.

The machine-readable storage medium 105 can comprise instructions to command the storage array 230 to store the set of surviving read-only snapshots from the plurality of snapshots within the storage array. Hence, the set of surviving read-only snapshots is the set of snapshots that are currently stored in the storage array 230, which are shown in FIG. 2 with solid lines (i.e. SS_T1 and SS_T3). The non-surviving snapshots are snapshots that may be removed from the storage array 230, and are shown with dotted lines in FIG. 2, i.e. SS_T2 and SS_T4.

According to instructions 110, the computing device 100 may command the storage array 230 to select one of the surviving snapshots, and specifically the one created at the nearest point in time to the given point in time. In another examples, the storage array 230 could be commanded to select a surviving snapshot that results in volumetrically less data being restored. Hence, either the surviving snapshot SS_T1 or SS_T3 could be selected based on the aforementioned condition. This condition may increase the efficiency of the process of restoration content of the volume 250 because snapshots created at near points in time may have less data changes than snapshots created at far points in time where data changes could increase. Hence, in order to restore content of the volume 250 at a given point in time in an efficient manner, a surviving snapshot created at the nearest point in time can be selected. Similarly, a surviving array that results in volumetrically less data being restored may also increase the efficiency of the process of restoration content of the volume 250.

Responsive to selecting a given point in time from the set of timestamps associated with the set of available backup objects in the deduplication system 270, e.g. T4, instructions 110 may command the storage array 230 to select the surviving snapshot SS_T3 created at timestamp T3 by the storage array 230 from the set of surviving snapshots according to the present example (i.e. from SS_T1 and SS_T3, as timestamp T3 may be the nearest point in time to timestamp T4).

The storage array 230 can create a read-only snapshot over a predetermined time slot or window of time. The window of time can be a fixed or variable and may vary based on the amount of changes in content of the volume 250. For example, a user could choose the size of the aforementioned window based upon calculation of restore volume of data. In a particular situation, the more modifications the volume 250 may have in time, the shorter the time slot may be in order to reflect these modifications into the read-only snapshots. The window of time can be, for example; configured by a user or an administrator of the computing device 100 or it could be programmatically chosen. Examples of windows of time can be e.g. days, weeks, months, hours, etc. In the case that content of the volume 250 changes very fast; more read-only snapshots can be created over time by the storage array 230 and the window of time may be reduced to ensure that a consistency or recovery point exists for an application using the volume 250.

Each created snapshot SS_T1, SS_T2, SS_T3 and SS_T4 can be transmitted from the storage array 230 to the deduplication system 270 via the internet network 280 upon instructions executed by the computing device 100. The deduplication system 270 can create and store a set of backup objects B_SS_T1, B_SS_T2, B_SS_T3 and B_SS_T4 associated with the received read-only snapshots SS_T1; SS_T2; SS_T3 and SS_T4 and comprising timestamps T1 to T4 respectively. Based on the present example, the backup objects associated with the surviving read-only snapshots in the storage array 230 can be B_SS_T1 and B_SS_T3 and the backup objects associated with the non-surviving read-only snapshots in the storage array 230 can be B_SS_T2 and B_SS_T4. The set of backup objects associated with the plurality of read-only snapshots can be permanently stored in the deduplication system 270. The manifests associated with the set of backup objects (e.g. M_B_SS_T1 to M_B_SS_T4) can be stored by a backup appliance of the deduplication system and retrieved by the computing device 100 upon discrete request by executing instructions 130, which may perform a delta function on a manifest of the backup object of the selected surviving snapshot (e.g. M_B_SS_T3) and a manifest of the backup object of the snapshot created at the given point in time T4 (e.g. M_B_SS_T4). Hence, the computing device 100 can retrieve from the deduplication system the suitable manifests for performing the delta function by executing instructions 130.

In other examples; any other point in time could be given to the computing device 100 and other nearest point in time could be selected among T1 to T4. In such examples, the restoration of content of the volume 250 could be performed forwards or backwards in time. For example, the machine-readable storage medium 105 can comprise instructions to determine that the nearest point in time may be prior to the given point in time and perform restoration of content of the volume forward in time to the given point in time, and the computing device can comprise instructions to determine that the nearest point in time may be after the given point in time and perform restoration of content of the volume backwards in time to the given point in time.

The instructions 140 when executed can restore content of the volume 250 at the given point in time by executing further instructions to produce an editable snapshot of content of the volume 250 at the given point in time E_SS_Tgiven by modifying the editable surviving snapshot E_SS_Tnearest based on the output of the delta function as follows:

$$E\_SS\_Tgiven = E\_SS\_Tnearest + \text{delta}(M\_B\_SS\_Tnearest, M\_B\_SS\_Tgiven)$$

According to the particular example show in FIG. 2, where the given time is T4 and the nearest point in time is T3:

$$E\_SS\_T4 = E\_SS\_T3 + \text{delta}(M\_B\_SS\_T3, M\_B\_SS\_T4)$$

Tables 1 and 2 show forward and backward in time restoration applied to the example shown in FIG. 2 with four read-only snapshots at different points in time i.e. T1 to T4 considering different set of surviving read-only snapshots of content of the volume 250 within in the storage array 230. In this respect, it can be considered that the earliest time is T1 and that the latest time is T4, hence T2 is after T1 and prior to T3 and so on.

TABLE 1

Editable snapshots of content of the volume 250 at different given and nearest points in time (Forward in time restoration):

| Given: T4 | Nearest: T1 | E_SS_T4 = E_SS_T1 + delta(B_SS_T1, B_SS_T4) |
| Given T4 | Nearest: T2 | E_SS_T4 = E_SS_T2 + delta(B_SS_T2, B_SS_T4) |
| Given T4 | Nearest: T3 | E_SS_T4 = E_SS_T3 + delta(B_SS_T3, B_SS_T4) |

TABLE 1-continued

Editable snapshots of content of the volume 250 at different given and nearest points in time (Forward in time restoration):

| Given T3 | Nearest: T2 | E_SS_T3 = E_SS_T2 + delta(B_SS_T2, B_SS_T3) |
| Given T3 | Nearest: T1 | E_SS_T3 = E_SS_T1 + delta(B_SS_T1, B_SS_T3) |
| Given T2 | Nearest: T1 | E_SS_T2 = E_SS_T1 + delta(B_SS_T1, B_SS_T2) |

TABLE 2

Editable snapshots of content of the volume 250 at different given and nearest points in time (Backward in time restoration):

| Given: T1 | Nearest: T2 | E_SS_T1 = E_SS_T2 + delta(B_SS_T2, B_SS_T1) |
| Given: T1 | Nearest: T3 | E_SS_T1 = E_SS_T3 + delta(B_SS_T3, B_SS_T1) |
| Given: T1 | Nearest: T4 | E_SS_T1 = E_SS_T4 + delta(B_SS_T4, B_SS_T1) |
| Given: T2 | Nearest: T3 | E_SS_T2 = E_SS_T3 + delta(B_SS_T3, B_SS_T2) |
| Given: T2 | Nearest: T4 | E_SS_T2 = E_SS_T4 + delta(B_SS_T4, B_SS_T2) |
| Given: T2 | Nearest: T1 | E_SS_T2 = E_SS_T1 + delta(B_SS_T1, B_SS_T2) |

Furthermore, instructions 140 when executed can restore content of the volume 250 at the given point in time by instructing the storage array 230 to produce a read-only snapshot at the given point in time based on the produced editable snapshot at the given point in time. In some examples, the read-only snapshot at the given point in time can be used to restore content of the volume 250 at the given point in time by executing instructions 140. Therefore instructions 140 can command the storage array to create a read only snapshot, SS_Tgiven based on the editable snapshot of content of the volume 250 E_SS_Tgiven that was produced by applying the above-shown equations of Tables 1 and 2 when executing instructions 140. Hence, instructions 140 may command the storage array 230 to convert the produced editable snapshot at the given point in time E_SS_Tgiven into the read only snapshot, SS_Tgiven.

The following tables shows an example to illustrate aspects of the delta function. In this respect, Table 3 shows manifests associated with backup objects of read-only snapshots for timestamps T1, T2 and T3. In particular, each illustrated manifest may comprise a list of six chunk signatures. In some examples, a chunk signature could be a hash value (i.e., the result of a hash function). Table 4 shows the output of different delta functions having as inputs different manifests from Table 3,

TABLE 3

| M_B_SS_T1 | | | | | | M_B_SS_T2 | | | | | | M_B_SS_T3 | | | | | |
|---|---|---|---|---|---|---|---|---|---|---|---|---|---|---|---|---|---|
| A | B | C | D | E | F | A | B | H | I | E | J | A | B | H | M | N | P |

TABLE 4

| DELTA (M_B_SS_T1, M_B_SS_T2) | | | DELTA (M_B_SS_T2, M_B_SS_T1) | | | DELTA (M_B_SS_T3, M_B_SS_T2) | | |
|---|---|---|---|---|---|---|---|---|
| H | I | J | C | D | F | I | E | J |

TABLE 4-continued

| DELTA (M_B_SS_T1, M_B_SS_T3) | DELTA (M_B_SS_T2, M_B_SS_T3) | DELTA (M_B_SS_T3, M_B_SS_T1) |
|---|---|---|
| H  M  N  P | M  N  P | C  D  E  F |

As shown in the examples of Table 4, the delta function may compare chunk signatures of a first manifest to the chunk signatures of a second manifest, respectively (e.g., comparing chunk signatures of the first manifest to chunk signatures at corresponding locations within the second manifest, respectively). Based on or resulting from this comparison, the delta function may identify chunk signature(s) of the second manifest that differ from the chunk signature(s) at corresponding locations of the first manifest. In such examples, the result of the delta function may identified differing chunk signatures may correspond to (and identify) the data chunks of the snapshot represented by the first manifest that may be changed to create a snapshot represented by the second manifest. In such examples, the result of the delta function may enable the desired snapshot to be created from an existing snapshot by updating the data chunks identified by the chunk signatures identified by the delta function. In examples described herein, the delta function may compare a first manifest associated a surviving snapshot at a nearest point in time (to a given point in time) to a second manifest associated with a snapshot created at the given point in time, and may identify the differing chunk signatures and the corresponding blocks of the surviving snapshot to change to create the snapshot for the given point in time.

Figure 3:
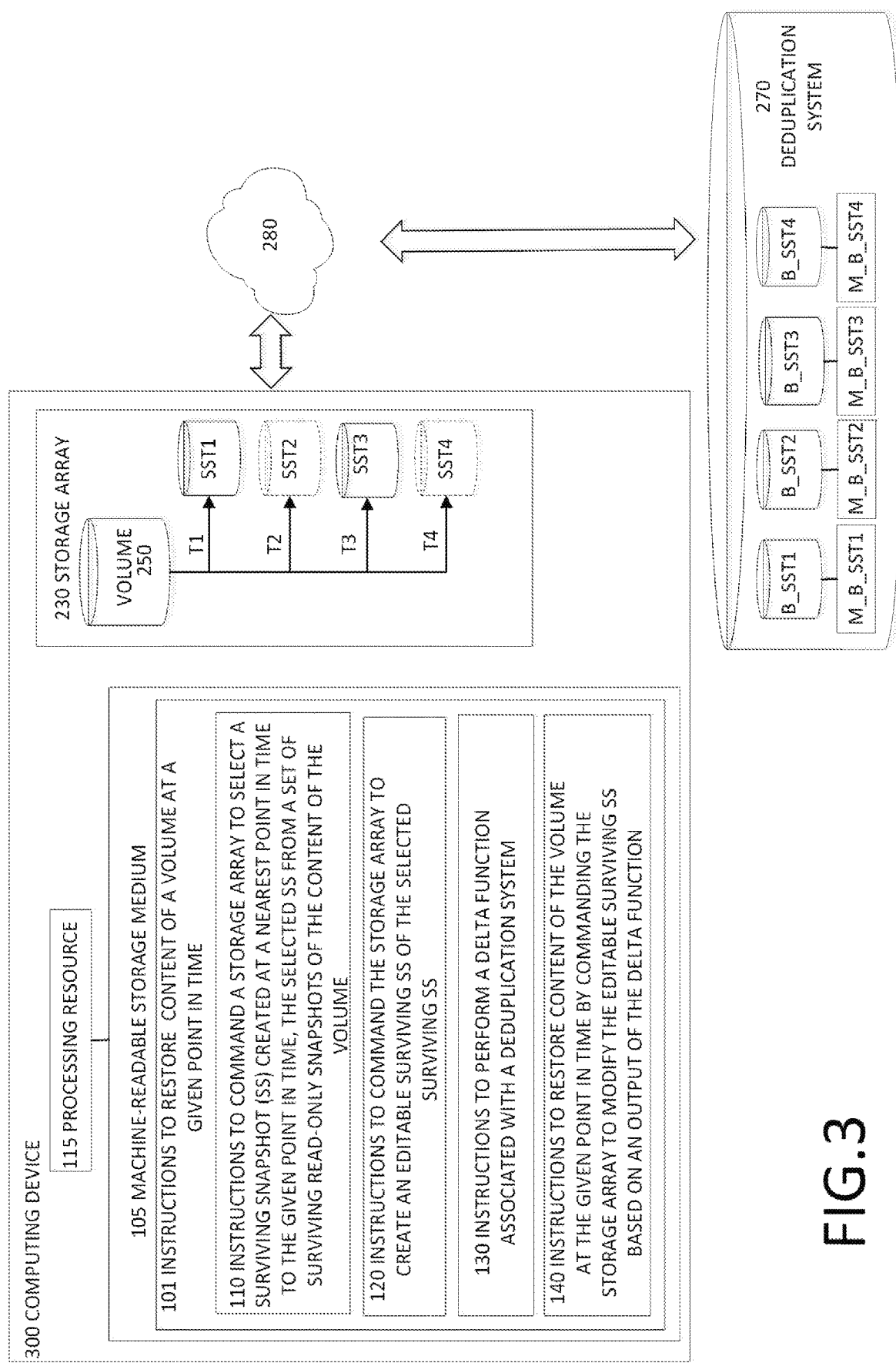
FIG. 3 is a block diagram of another example computing device to restore content of a volume at a given point in time according to the present disclosure.

Turning now to FIG. 3, the computing device 300 comprises the machine-readable storage medium 105 previously described in FIG. 1 and FIG. 2 and the storage array 230 previously described in FIG. 2. Furthermore, FIG. 3 shows the deduplication system 270 previously described in FIG. 2 in communication with the computing device 300 via the internet network 280. Hence, the volume 250 can be comprised within the computing device 300 that comprises the machine-readable storage medium 105 that can execute instructions to restore content of a volume at a given point in time. Analogously to FIG. 1 and FIG. 2, the machine-readable storage medium comprises instructions 110, 120, 130 and 140 and the storage array 230 can be instructed by the aforementioned instructions to create a plurality of read-only snapshots of content of the volume 250, to store a set of surviving read-only snapshots from the plurality of snapshot within the storage array and to transmit to the deduplication system 270 the plurality of read-only snapshots of content of the volume 250.

The computing device 300 can perform a delta function associated with the deduplication system 270 based on received manifests associated with backup objects. The transmission of the manifest by the deduplication system 270 and the processing of the manifests by the computing device 300 can increase the efficiency of the restoration process as the examples described herein can take use of the manifest instead of full backup copies to achieve restoration of content of the volume, thus minimizing network bandwidth to effect a full restoration of the volume 250.

Figure 4:
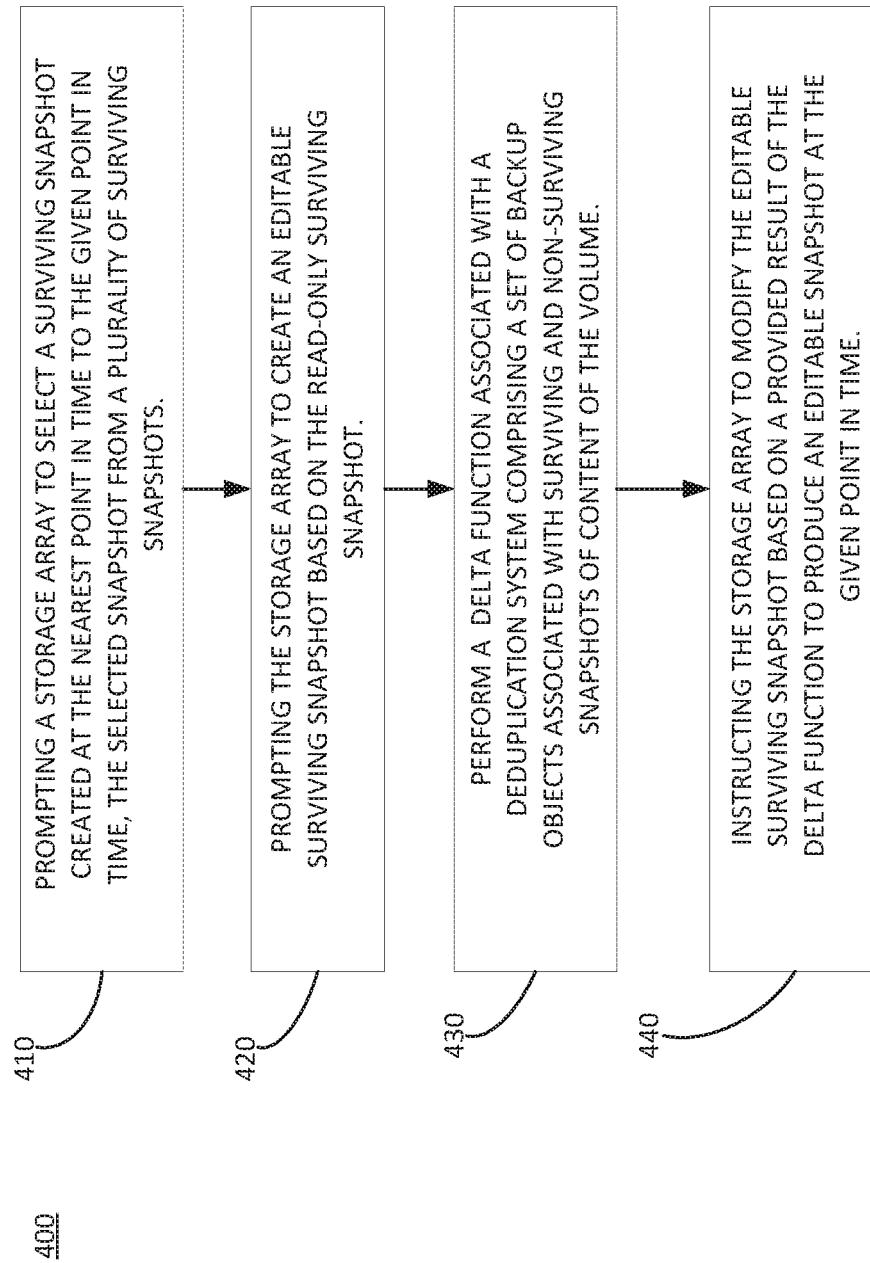
FIG. 4 is a flow diagram depicting an example method to restore content of a volume at a given point in time.

Turning now to FIG. 4, it shows a flow diagram 400 depicting an example method to restore content of a volume at a given point in time. This example method could be implemented e.g, by a computing device such as computing device 100 of FIGS. 1 to 3. In particular the flow diagram 400 can comprise a block 410 for prompting a storage array to select a surviving snapshot having being created at a nearest point in time to the given point in time, the surviving snapshot from a set of surviving read-only snapshots of content of the volume stored in the storage array. A plurality of read-only snapshots can be created by the storage array. A block 410 can be performed by executing instructions 110 previously described.

In examples described herein, upon reception of information associated with a recovery point objective snapshot, block 410 may select a surviving snapshot by volumetric comparison of restore data among the set of surviving read-only snapshots and the recovery point objective snapshot.

The flow diagram 400 can comprise a block 420 for prompting the storage array to create an editable surviving snapshot of the surviving snapshot. The block 420 can be performed by executing instructions 120 previously described.

The flow diagram 400 can comprise a block 430 for performing a delta function associated with a deduplication system, the deduplication system comprising a set of backup objects of surviving and non-surviving read-only snapshots of content of the volume. The deduplication system can comprise a set of backup objects for the set of surviving read-only snapshots created in the storage array and a set of backup objects for a set of non-surviving read-only snapshots of content of the volume. Each of the backup objects in the deduplication system can comprise a manifest and an associated timestamp analogously to the snapshots, the manifest comprising a list of chunk signatures as e.g. hash values that can represents chunks of data. The set of non-surviving read-only snapshots of content of the volume may not be stored in the storage array. The block 430 can be performed by executing instructions 130 previously described.

The flow diagram 400 can comprise a block 440 for instructing the storage array to modify the editable surviving snapshot based on a provided result of the delta function to produce an editable snapshot at the given point in time. The delta function can be performed between a manifest of a backup object of the selected surviving snapshot and a manifest of a backup object of a snapshot at the given point in time. The block 440 can be performed by executing instructions 140 previously described.

In other examples according to the present disclosure, the flow diagram 400 can comprise an additional block for requesting to the deduplication system the manifest of the backup object of the selected surviving snapshot and the manifest of the backup object of the snapshot at the given point in time. This block could be performed by executing instructions 130 previously described.

The flow diagram 400 can further comprise a block for prompting the storage array to create a read only snapshot at the given point in time based on the editable snapshot at the given point in time and restoring content of the volume at the given point in time based on the created read only snapshot at the given point in time. This block could be performed by executing instructions 140 previously described.

The flow diagram 400 can further comprise a block for prompting the storage array to create a plurality of read-only snapshots of content of the volume having each snapshot an associated timestamp, the plurality of snapshots comprising the set of surviving and the set of non-surviving read-only snapshots of content of the volume, a block for prompting the storage array to store the set of surviving read-only snapshots from the plurality of snapshots in the storage array, a block for prompting the storage array to transmit to the deduplication system the plurality of snapshots and a block for prompting the storage array to remove the set of non-surviving read-only snapshots from the storage array. This block could be performed by executing instructions 120 previously described.

The flow diagram 400 can comprise a block for determining the set of surviving read-only snapshots and the set of non-surviving read-only snapshots from the plurality of read-only snapshots based on predetermined conditions as retention/expiry settings defined by a user or system's administrator. This block could be performed by executing instructions 110 previously described.

Turning now to FIG. 5, it shows a block diagram 500 depicting an example machine-readable storage medium 505 comprising instructions executable by a processing resource 515 to restore content of a volume at a given point in time.

The machine-readable storage medium 505 can comprise instructions 501 to restore content of a volume at given point in time. In particular instructions 501 can comprise machine-readable instructions 510 to select a surviving snapshot from a set of surviving read-only snapshots of content of the volume stored in a storage array within the computing device, the selected snapshot being created at a nearest point in time to the given point in time. The given point in time can be selected from a set of timestamps associated with a set of available backup objects stored in a deduplication system. The snapshots can be created in the storage array. The volume can be defined as a unit of data storage as e.g. a parent volume. The volume can be comprised in the storage array as part of the computing device. The storage array comprising the volume can be commanded by the instructions comprised within the machine-readable storage medium 505.

The set of surviving read-only snapshots can be defined as the snapshots stored in the storage array. Instructions 510 can permit the selection of the read-only snapshots at the nearest point in time from among the set of surviving read-only snapshots stored in the storage array by comparing the date of creation of each read-only snapshot from the set of surviving snapshots previously stored in the storage array with the point in time for restoration of content of the volume. In another examples, upon reception of information associated with a recovery point objective snapshot, instructions 510 may select a surviving snapshot by volumetric comparison of restore data among the set of surviving read-only snapshots and the recovery point objective snapshot.

Hence, once the instructions 510 determines the surviving snapshot at the nearest point in time or the surviving snapshot that could imply volumetrically less data being restored, instructions 510 can command the storage array to select it from the set of surviving read-only snapshots.

The machine-readable storage medium 505 can comprise machine-readable instructions 520 to create an editable surviving snapshot of the surviving snapshot. An editable snapshot may permit the computing device upon instructions 520 to modify content of the snapshot.

The machine-readable storage medium 505 can comprise machine-readable instructions 530 to perform a delta function associated with a remote deduplication system. The deduplication system can comprise a set of backup objects of surviving read-only snapshots and a set of backup objects of non-surviving read-only snapshots of content of the volume. Each of the backup objects within the deduplication system can comprise a manifest and a timestamp and each manifest comprising a list of chunk signatures as e.g. hash values that can represent chunks of data associated with the read-only snapshots. The delta function can be performed between a manifest of a backup object of the selected snapshot and a manifest of a backup object of a snapshot created at the given point in time. The output of the delta function can indicate one or more chunks of data of the editable surviving snapshot to be modified by the computing device.

The machine-readable storage medium 505 can comprise machine-readable instructions 540 to restore content of the volume at the given point in time including modifying the editable surviving snapshot based on an output of the delta function and converting the modified editable surviving snapshot into a read-only snapshot of content of the volume, The machine-readable storage medium 505 can further comprise machine-readable instructions to parse content of the volume to create a plurality of read-only snapshots of content of the volume, the plurality of read-only snapshots comprising the set of surviving read-only snapshots and a set of non-surviving read-only snapshots of content of the volume. The plurality of read-only snapshots can be created based on a fixed time slot or a variable time slot, wherein the variable time slot varies based on the amounts of changes in the volume. The more modifications the volume may suffer in time, the shortest the time slot may be in order to reflect these modifications in the read-only snapshots. The computing device can command the storage array to create a number of read-only snapshots over a predetermined time slot or window of time T upon machine readable instructions. The time slot can be configured e.g. by a user or an administrator of the computing device 100. Examples of time slots can be e.g. days, weeks, months, etc. In the case that content of the volume changes very fast, more read-only snapshots can be created over time by commanding the storage array upon instructions from the machine-readable storage medium 505. Furthermore, the time slot may be reduced to ensure that a consistency or recovery point exists for an application using the volume.

The machine-readable storage medium 505 can further comprise machine-readable instructions to identify the set of surviving read-only snapshots from the plurality of read-only snapshots and the set of non-surviving read-only snapshots from the plurality of read-only snapshots based on retention/expiry settings defined by a user or a system's administrator or by a computing program. These retention/expiry settings could be based on e.g. a policy, a quality of service or infrastructure capabilities.

The machine-readable storage medium 505 can further comprise machine-readable instructions to store the identified set of surviving read-only snapshots in the storage array and transmit to plurality of snapshots to the deduplication system. The set of non-surviving read-only snapshots from the plurality of read-only snapshots may not be stored in the storage array but transmitted to the deduplication system in communication with the computing device executing instructions according to the machine-readable storage medium 505. The deduplication system may be in communication with the computing device via a network as e.g. Internet.

The sequence of operations described in connection with FIGS. 1 to 5 are examples and are not intended to be limiting. Additional or fewer operations or combinations of operations may be used or may vary without departing from the scope of the disclosed examples. Furthermore, implementations consistent with the disclosed examples may not perform the sequence of operations or instructions in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A computing device comprising:
   a physical processor; and
   a machine-readable storage medium comprising machine readable instructions executable by the processor that cause the computing device to:
      select one of a plurality of non-surviving snapshots as a recovery point objective snapshot to restore to a storage array from a deduplication system, wherein the deduplication system comprises backup objects for each of a plurality of snapshots of content of a volume of the storage array, wherein each of the backup objects comprises a manifest including a list of chunk signatures that represent chunks of data, and wherein the storage array is separate from the deduplication system;
      wherein the plurality of snapshots comprise surviving snapshots and the non-surviving snapshots, wherein the surviving snapshots are snapshots that are currently stored on the storage array, and the non-surviving snapshots are snapshots that have been removed from the storage array, wherein the backup objects for the surviving snapshots and for the non-surviving snapshots are stored on the deduplication system;
      command the storage array to select, from among the surviving snapshots currently stored on the storage array, the surviving snapshot having a least amount of data to restore relative to the selected non-surviving snapshot, wherein the selection is based on a comparison between the selected non-surviving snapshot and the surviving snapshots;
      command the storage array to create an editable version of the selected surviving snapshot;
      perform a delta function between:
         a manifest, stored on the deduplication system, of the backup object of the selected surviving snapshot; and
         a manifest, stored on the deduplication system, of the backup object of the selected non-surviving snapshot; and
      command the storage array to modify the editable version of the selected surviving snapshot based on an output of the delta function to restore content of the volume based on the recovery point objective snapshot.

2. The computing device according to claim 1, wherein the instructions comprise instructions executable by the processor to:
   command the storage array to produce a read-only snapshot of content of the volume at a given point in time associated with the selected recovery point objective snapshot based on the modified editable version of the selected surviving snapshot.

3. The computing device according to claim 1, wherein the computing device comprises the storage array.

4. The computing device according to claim 3, wherein the instructions are executable by the processor to:
   command the storage array to create each of the plurality of snapshots of content of the volume;
   command the storage array to transmit to the deduplication system the plurality of snapshots;
   command the storage array to remove the non-surviving snapshots from the storage array;
   wherein the surviving and non-surviving snapshots are determined by the computing device based on predetermined conditions.

5. The computing device according to claim 4, wherein the plurality of snapshots are created based on:
   a fixed time slot; or
   the amounts of changes in content of the volume.

6. The computing device of claim 1, the instructions to:
   select the non-surviving snapshot as the recovery point objective snapshot based on an indication of a given point in time received by the computing device.

7. The computing device of claim 6, wherein the indication of the given point in time comprises one of:
   a received selection of a timestamp from a set of timestamps, wherein the instructions are to select the snapshot nearest to the selected timestamp as the recovery point objective snapshot; or
   a received selection of one of the plurality of snapshots.

8. A method to be performed by a deduplication system comprising a physical processor, the method comprising:
   select one of a plurality of non-surviving snapshots as a recovery point objective snapshot to restore to a storage array from the deduplication system, wherein the deduplication system comprises backup objects for each of a plurality of snapshots of content of a volume of the storage array, wherein each of the backup objects comprises a manifest including a list of chunk signatures that represent chunks of data, and wherein the storage array is separate from the deduplication system;
   wherein the plurality of snapshots comprise surviving snapshots and the non-surviving snapshots, wherein the surviving snapshots are snapshots that are currently stored on the storage array, and the non-surviving snapshots are snapshots that have been removed from the storage array, wherein the backup objects for the surviving snapshots and for the non-surviving snapshots are stored on the deduplication system;
   prompting the storage array to select, from among the surviving snapshots currently stored on the storage array, the surviving snapshot having a least amount of data to restore relative to the selected non-surviving snapshot, wherein the selection is based on a comparison between the selected non-surviving snapshot and the surviving snapshots;
   prompting the storage array to create an editable version of the selected surviving snapshot;
   performing a delta function between:
      a manifest, stored on the deduplication system, of the backup object of the selected surviving snapshot; and
      a manifest, stored on the deduplication system, of the backup object of the selected non-surviving snapshot; and
   instructing the storage array to modify the editable version of the surviving snapshot based on a provided result of the delta function to restore content of the volume based on the recovery point objective snapshot.

9. The method of claim 8, further comprising:
requesting, from the deduplication system, the manifest of the backup object of the selected surviving snapshot and the manifest of the backup object of the selected non-surviving snapshot.

10. The method of claim 8, further comprising:
prompting the storage array to create the plurality of snapshots;
prompting the storage array to store the surviving snapshots in the storage array;
prompting the storage array to transmit to the deduplication system the plurality of snapshots; and
prompting the storage array to remove the non-surviving snapshots from the storage array.

11. The method of claim 10, further comprising:
determining the surviving snapshots and the non-surviving snapshots from the plurality of snapshots based on predetermined conditions.

12. The method of claim 8, wherein the selecting the recovery point objective snapshot comprises:
selecting, as the recovery point objective snapshot, the nearest snapshot of the plurality of snapshots to a received selection of a timestamp.

13. The method of claim 8, wherein the recovery point objective snapshot is selected based on a received selection of one of the plurality of snapshots.

14. A non-transitory machine-readable storage medium comprising machine-readable instructions executable by a physical processor to:
select one of a plurality of non-surviving snapshots as a recovery point objective snapshot to restore to a storage array from a deduplication system, wherein the deduplication system comprises backup objects for each of a plurality of snapshots of content of a volume of the storage array, wherein each of the backup objects comprises a manifest including a list of chunk signatures that represent chunks of data, and wherein the storage array is separate from the deduplication system;
wherein the plurality of snapshots comprise surviving snapshots and the non-surviving snapshots, wherein the surviving snapshots are snapshots that are currently stored on the storage array, and the non-surviving snapshots are snapshots that have been removed from the storage array, wherein the backup objects for the surviving snapshots and for the non-surviving snapshots are stored on the deduplication system;
select, from among the surviving snapshots currently stored on the storage array, the surviving snapshot having a least amount of data to restore relative to the selected non-surviving snapshot, wherein the selection is based on a comparison between the selected non-surviving snapshot and the surviving snapshots;
create an editable version of the selected surviving snapshot;
perform a delta function between:
a manifest, stored on the deduplication system, of the backup object of the selected surviving snapshot; and
a manifest, stored on the deduplication system, of the backup object of the selected non-surviving snapshot; and
modify the editable version of the selected surviving snapshot based on an output of the delta function to restore content of the volume based on the recovery point objective snapshot and covert the modified editable version of the selected surviving snapshot into a read-only snapshot of content of the volume.

15. The non-transitory machine-readable storage medium of claim 14, the instructions to:
parse content of the volume to create the plurality of snapshots.

16. The non-transitory machine-readable storage medium of claim 15, wherein the plurality of snapshots are created based on:
a fixed time slot; or
the amounts of changes in the volume.

17. The non-transitory machine-readable storage medium of claim 16, the instructions to:
store the surviving snapshots in the storage array; and
transmit the plurality of snapshots to the deduplication system.

18. The non-transitory machine-readable storage medium of claim 15, the instructions to:
identify the surviving snapshots and the non-surviving snapshots from the plurality of snapshots based on retention settings.

19. The non-transitory machine-readable storage medium of claim 14, wherein the output of the delta function indicates one or more chunks of data of the editable version of the selected surviving snapshot to be modified by the computing device.

20. The non-transitory machine-readable storage medium of claim 14, the instructions to select the recovery point objective snapshot based on:
a received selection of a timestamp from a set of timestamps, wherein the instructions are to select the snapshot nearest to the selected timestamp as the recovery point objective timestamp; or
a received selection of one of the plurality of snapshots.

* * * * *